(12) United States Patent
Willibeek-LeMair et al.

(10) Patent No.: US 8,782,787 B2
(45) Date of Patent: Jul. 15, 2014

(54) DISTRIBUTED PACKET FLOW INSPECTION AND PROCESSING

(75) Inventors: Marc Willibeek-LeMair, Austin, TX (US); Brian C. Smith, Fort Worth, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 559 days.

(21) Appl. No.: 12/911,912

(22) Filed: Oct. 26, 2010

(65) Prior Publication Data
US 2011/0099631 A1   Apr. 28, 2011

Related U.S. Application Data

(60) Provisional application No. 61/255,720, filed on Oct. 28, 2009.

(51) Int. Cl.
*H04L 29/06* (2006.01)
(52) U.S. Cl.
USPC .......... 726/23; 726/13; 370/241; 370/395.41; 370/395.43; 370/360; 370/428; 709/224; 709/249; 709/225; 709/201; 709/205; 709/217; 709/229
(58) Field of Classification Search
USPC .......... 726/13, 23–26; 370/241, 428, 395.41, 370/360, 395.43; 709/224, 249, 225, 201, 709/205, 217, 229
See application file for complete search history.

(56) References Cited

U.S. PATENT DOCUMENTS

| | | | |
|---|---|---|---|
| 5,278,901 A | | 1/1994 | Shieh et al. |
| 6,105,027 A | * | 8/2000 | Schneider et al. ............... 1/1 |
| 6,880,087 B1 | | 4/2005 | Carter |
| 6,983,323 B2 | | 1/2006 | Cantrell et al. |
| 7,134,143 B2 | | 11/2006 | Stellenberg et al. |
| 7,159,237 B2 | | 1/2007 | Schneier et al. |
| 7,197,762 B2 | | 3/2007 | Tarquini |
| 7,228,564 B2 | | 6/2007 | Raikar et al. |
| 7,779,126 B1 | * | 8/2010 | Cheriton ....................... 709/226 |
| 2004/0030776 A1 | * | 2/2004 | Cantrell et al. ............... 709/224 |
| 2004/0093513 A1 | | 5/2004 | Cantrell et al. |
| 2006/0195896 A1 | * | 8/2006 | Fulp et al. ....................... 726/11 |
| 2008/0168561 A1 | | 7/2008 | Durie et al. |
| 2010/0031358 A1 | * | 2/2010 | Elovici et al. ................... 726/24 |

FOREIGN PATENT DOCUMENTS

| | | |
|---|---|---|
| CN | 1564547 | 1/2005 |
| WO | WO 2006/093557 | 9/2006 |

OTHER PUBLICATIONS

Toedmann et al., "Anticipatory Distributed Packet Filter Configuration for Carrier-Grade IP-Networks", Networking 2006, LNCS 3976, pp. 928-941, 2006.*
International Search Report, PCT/US2009/062402, Dec. 12, 2009.

* cited by examiner

*Primary Examiner* — Hadi Armouche
*Assistant Examiner* — Hee Song (57) ABSTRACT

Distribution of network processing load among a set of packet processing devices is improved by employing means for eliminating, controlling, or otherwise affecting redundant packet processing operations. In one embodiment, at least two packet processing devices are present, both capable of processing data packets flowing therethrough, such as, inspecting, detecting, and filtering data packets pursuant to one or more filters from a filter set. Redundancy is controlled by providing or enabling either or both of the packet processing devices with capability for detecting during its said inspection of said data packets that, for example, one or more filters had been previously executed on said data packets by the other packet processing device, and then not executing the previously-executed filters on said data packets.

21 Claims, 5 Drawing Sheets

| IPS2 | |
|---|---|
| Address | Filter Set |
| Subnet 1 | none |
| Subnet 2 | Set X |
| Subnet 3 | none |
| Subnet 4 | none |
| Subnet 5 | none |
| Subnet 6 | none |
| Subnet 7 | none |
| All others | none |

182

| IPS2 | | |
|---|---|---|
| D_Address | S_Address | Filter Set |
| Any | Subnet 2 | Set A |
| Subnet 2 | Subnet 1 | Sets A&B |
| Subnet 2 | NotSubnet 1 | Set A |

183

| IPS3 | | |
|---|---|---|
| D_Address | S_Address | Filter Set |
| Subnet 3 | Subnet 4 | Sets A,B&C |
| Subnet 3 | NotSubnet4 | Sets A&C |
| Subnet 4 | Subnet 3 | Sets A,B&C |
| NotSubnet 4 | Subnet 3 | Sets A&C |

184

| IPS5 | | |
|---|---|---|
| D_Address | S_Address | Filter Set |
| Any | Any | Set B |

DISTRIBUTED PACKET FLOW INSPECTION AND PROCESSING

This application claims the benefit of the filing date of U.S. provisional application no. 61/255,720 filed Oct. 28, 2009, entitled "Distributed Packet Flow Inspection and Processing," the entire contents of which is incorporated herein by reference.

FIELD

The present invention is directed to the distribution of network packet processing load across packet processing devices, particularly wherein the load is distributed across packet filtering devices by employing means for controlling or otherwise affecting redundant filtering operations.

BACKGROUND

The use by enterprises of network technology to transact business, commercial management, academic research, institutional governance, and like missions is pervasive. Network technology—particularly digital packet-switched network technologies—enables the extensive sharing and communication of information (such as documents, numerical data, images, video, audio, and multimedia information), resources (such as servers, personal computers, data storage, and security devices), and applications (such as word processing, accounting, financial, database, spreadsheet, presentation, email, communication, network management, and security applications), within and beyond local and wide-area enterprise networks.

While packet-switched networks vary considerably in topology, size, and configuration, fundamentally all such networks invariably comprise at least two "nodes" communicably-linked (by wired or wireless connections) to enable the transmission of digital packet-encapsulated data therebetween. Nodes—as known to those skilled in the art—includes desktop computers, laptop computers, work stations, user terminals, mainframe computers, servers, network attached storage, network printers, and other destinations, origins or termination points for said digital packet-encapsulated data.

Networking devices—sometimes referred to in the art as "intermediate systems" or "interworking units"—are also commonly, if not invariably, present in packet-switched networks. These, in contrast to nodes, function principally to manage, regulate, shape, or otherwise mediate data traffic between network nodes. Switches, gateways, and routers, for example, direct packet traffic between nodes within a network, as well as traffic into and out of the network. Likewise, certain network security devices—functioning as so-called "hybrid" networking devices—mediate packet traffic entering into or within a network, by filtering, isolating, tagging, and/or otherwise regulating data packets or data packet flows.

In common intrusion prevention system (IPS) deployments, multiple IPS units may be distributed throughout a network to protect and segment the network based on several factors including an organizations network topology and critical asset locations. For example, it is typical for an IPS to be placed at the WAN access point(s) as well as in front of the data center and between different segments of the network to create independent security zones. As such, a flow may pass through multiple IPSs as it traverses the network. At each IPS the same flow may be inspected by the same set or subset of filters incurring duplicative processing cycles with no added value.

Therefore, there is a need for techniques to for avoiding redundant packet inspection in packet-switched networks.

SUMMARY

In response to the aforementioned need, embodiments of the present invention provide techniques for distributing network processing load across a set of packet processing devices, wherein said method employs means for eliminating or otherwise controlling redundant packet processing operations.

Toward this end, embodiments of the present invention provide a network comprising at least two packet processing devices, wherein: (a) a first of said packet processing devices is capable of processing data packets flowing therethrough, (b) a second of said packet processing devices is also capable of processing data packets flowing therethrough; and (c) said first packet processing device is capable of detecting during its said processing of said data packets whether one or more packet processing operations had been previously executed on said data packets by said second packet processing device. If said first packet processing device detects that packet processing has previously been executed on said data packets by said second packet processing device, said first packet processing device may decline to perform packet processing on said data packets. If said first packet processing device detects that packet processing has not been executed previously on said data packets by said second packet processing device, said first packet processing device may perform packet processing on said data packets.

In one preferred embodiment, the present invention seeks to affect redundancy in so-called network intrusion prevention systems (IPSs), which particularly comprise a set of in-line packet filter devices distributed throughout a network. In accordance with this embodiment, the inventive network comprises at least two packet processing devices, wherein: (a) a first of said packet processing devices is capable of inspecting and filtering data packets flowing therethrough, said filtering being accomplished by executing one or more filters from a filter set; (b) a second of said packet processing devices is also capable of inspecting and filtering data packets flowing therethrough, said filtering also being accomplished by executing one or more filters from said filter set; and (c) said first packet processing device is capable of detecting during its said inspection of said data packets whether one or more filters had been previously executed on said data packets by said second packet processing device. If said first packet processing device detects that a particular filter has previously been executed on said data packets by said second packet processing device, said first packet processing device may decline to apply that particular filter to said data packets. If said first packet processing device detects that the particular filter has not been executed previously on said data packets by said second packet processing device, said first packet processing device may apply that particular filter to said data packets.

One class of implementations encodes a unique identifier that identifies the set of filters that have already been applied to inspect the packet. Downstream IPSs use this field to avoid replicating the same filter inspection. The unique identifier may be written into a field of the packet. By writing into the packet field, the IPS system in effect redefines, re-purposes, or hijacks the packet field. Some fields that could be used are the IP options field; the diffserv bits; or the VLAN/MPLS tags.

A second implementation utilizes knowledge of the network topology and the placement of other IPSs in that topology. A centralized or distributed method can utilize the topology information to prevent redundant processing and possibly to spread the processing load across more then one IPS. In either the centralized or distributed methods, the topology may be learnt by from information in layer 2 or layer 3 topology related protocol messages or from other signaling protocols. In the centralized method one device obtains the topology information, the placement of the IPS in that topology, and assigns the work load division information or instructions to each of the IPS. In the distributed method, each IPS obtains the topology information, the placement of this IPS and possible other IPSs in that topology and each IPS decides what processing to do on each packet. That decision may be based on what previous IPS processing has been done, the work load of this IPS, and what processing may be done by other IPSs in the known topology between this IPS and the destination of the packet.

One advantage of embodiments of the present invention is that they provide enable network processing load to be distributed across a set of packet processing devices to eliminate, control, or otherwise affect redundant packet processing operations.

Another advantage of embodiments of the present invention is that they distribute network packet filtering load across a set of packet filtering devices to eliminate, control, or otherwise affect (completely or partially) redundant filtering operations among said set of packet filtering devices.

Another advantage of embodiments of the present invention is that they distribute network packet filtering load by inserting and detecting a unique identifier in a packet or packet stream contemporaneously with passage thereof through said packet filtering devices. The presence or absence of said unique identifier indicates the prior passage of said packet stream through one of said filtering devices.

Another advantage of embodiments of the present invention is that they distribute network packet filtering load using shared network topology information which is hosted in said network to enable access (full or restricted) by each of said set of packet filtering devices.

These and other features and advantages of embodiments of the present invention will become apparent to one ordinarily skilled in the art from the following detailed description taken in conjunction with the accompanying drawings.

DETAILED DESCRIPTION

The present invention seeks to broadly encompass all products, systems, and methodologies, within the scope of the claims presented herein, for distributing network processing load across a set of packet processing devices, wherein said products, systems, and methodologies employ means or steps for eliminating, reducing, controlling, or otherwise affecting redundant packet processing operations. Certain specific examples of such products, systems, and methodologies—including components thereof—are presented in FIGS. 1A to 4.

Although the invention is capable of assuming several and various embodiments, all such embodiments employ, within a network, at least two packet-processing devices (e.g., "first" and "second" "packet processing devices"), each capable of processing data packets flowing therethrough, and wherein at least one of said devices is capable of detecting during its processing of said data packets that one or more packet processing operations had been previously executed on said data packets by the other packet processing device.

The "first" and "second" packet processing devices, in respect of tangible product embodiments thereof, need not be identical in either their physical configuration or overall range or degree of functionality. For example, the "first" packet processing device may be configured for the comparatively low traffic areas of a network's "edge," whereas the "second" packet processing device may be configured for the comparatively high traffic areas of a network's "core". Thus, while the first packet processing device may employ a more streamlined operating system and less advanced storage and logic circuitry than that employed by the second packet processing device, use of such devices are within the scope of the redundancy—both are capable of executing a substantially similar set of packet processing operations (i.e., the aforementioned "one or more packet processing operations").

The packet processing operations contemplated by the present invention include any computational operation in which packetized data are compressed, decompressed, encrypted, decrypted, classified, declassified, searched, or submitted to other like deep-packet processing operations. While the invention accommodates broad variation, the principal packet processing operations are the packet inspection and filtering operations employed in the known network intrusion prevention and network intrusion detection technologies.

Network intrusion prevention technologies are disclosed, for example, in U.S. Pat. No. 6,983,323, issued to Craig Cantrell et al. on Jan. 3, 2006; U.S. Pat. No. 7,134,143, issued to Gerald S. Stellenberg et al. on Nov. 7, 2006; U.S. Pat. App. Pub. No. 2004/0093513, filed by Craig Cantrell et al., on Nov. 7, 2002; and U.S. Pat. No. 7,197,762, issued to R. Tarquini on Mar. 7, 2007. Network intrusion detection technologies and/or network security related packet processing operations are described, for example, in U.S. Pat. No. 7,159,237, issued to B. Schneir et al. on Jan. 2, 2007; U.S. Pat. No. 7,228,564, issued to A. Reikar on Jun. 5, 2007; U.S. Pat. No. 6,880,087, issued to E. Carter on Apr. 12, 2005; and U.S. Pat. No. 5,278,901, issued to S. Shieh et al. on Jan. 11, 1994.

The packet processing devices are installed into a host network as "in line" devices (cf., so-called "bumps in the wire") such that all packets flowing therethrough are subjected to the aforementioned packet processing operations. Typically, several packet processing devices will be distributed through a network. In accordance with embodiments of the invention, the "first" and "second" packet processing devices will be located in the network such that data packet traffic from a source to its destination (i.e., wherein at least one of said source or destination is inside the network) is capable of passing through both the first and the second packet processing devices before reaching it destination.

Such a condition assures implementation of the invention only in instances wherein a potential of redundancy exists.

Figure 1A:
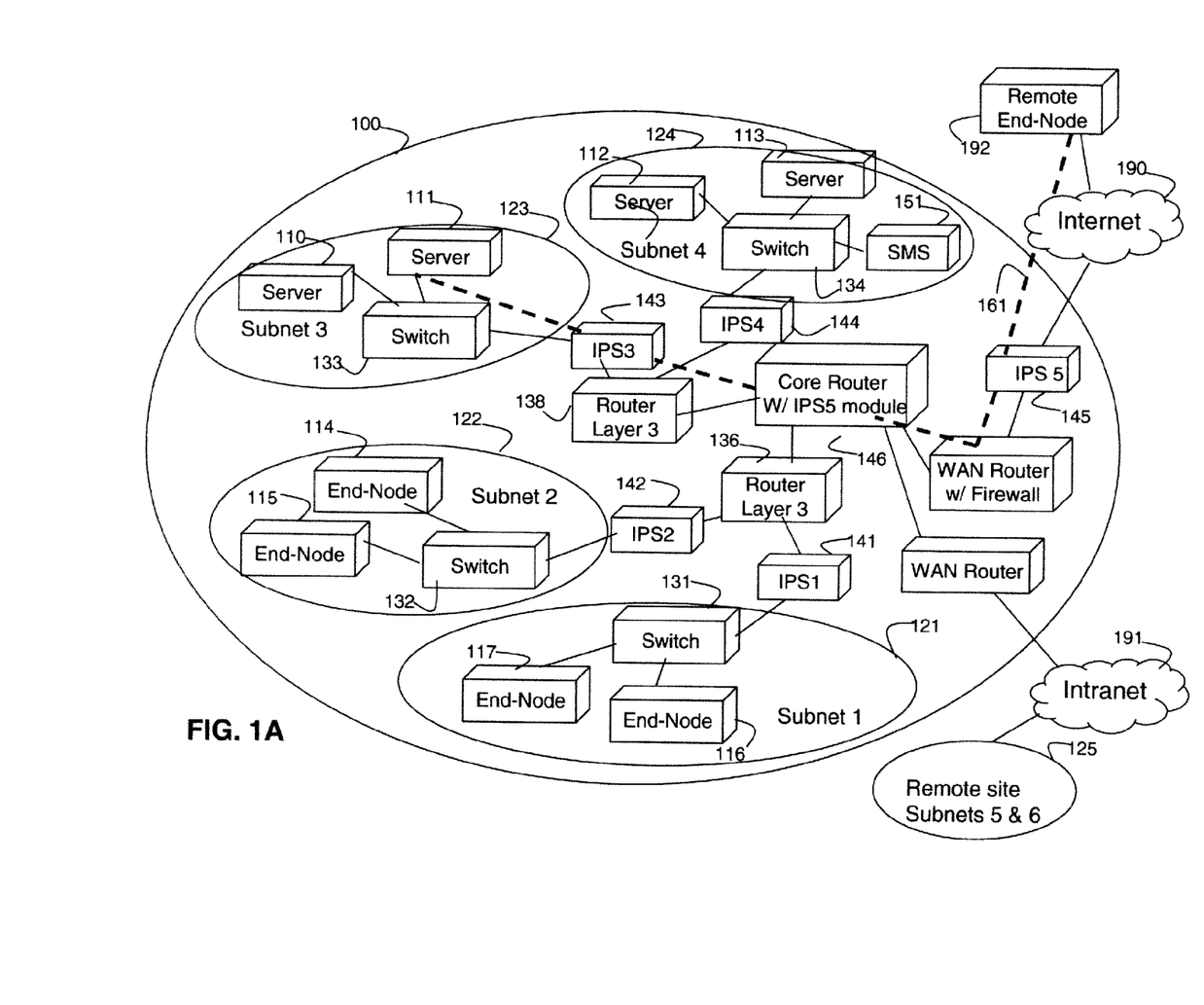
FIG. 1A illustrates schematically a network 100 comprising a plurality of packet processing devices 141, 142, 143, 144, and 145, which in accordance with the invention, are configured to distribute packet processing functionality.

FIG. 1A illustrates schematically a Local Area Network (LAN) 100 that is connected to other corporate sites through an intranet and remote users via the Internet 190. Traffic traversing the network from source to destination may pass through more than one packet inspection device such as an IPS. For example, if end node 114 retrieves data from server 113, then the packets carrying the data will pass through IPS4 144 and IPS5 146 and IPS2 142. It would be advantageous not to have all three IPS devices repeat the same checking of these packets carrying the data between end node 114 and server 113.

Two examples of techniques for reducing or eliminating redundant packet inspection will now be described. In one embodiment, each packet carries an identifier, which directly or indirectly and along with the use of other data, indicates which previous packet processing operation(s) have been performed on the packet, and/or indicates which processing has not been and should be performed on this packet. In either case, the identifiers enable packets that have already been processed by an upstream IPS to avoid duplicate processing downstream. Intelligent tagging of the flows results in either bypassing inspection processing altogether or reducing the required inspection to a fraction of the processing which would otherwise be performed by prior art systems, thereby optimizing IPS engine efficiency. Tagging packets thereby reduces the overall IPS processing capacity needed to secure a network and reduces traffic latency.

Figure 2:
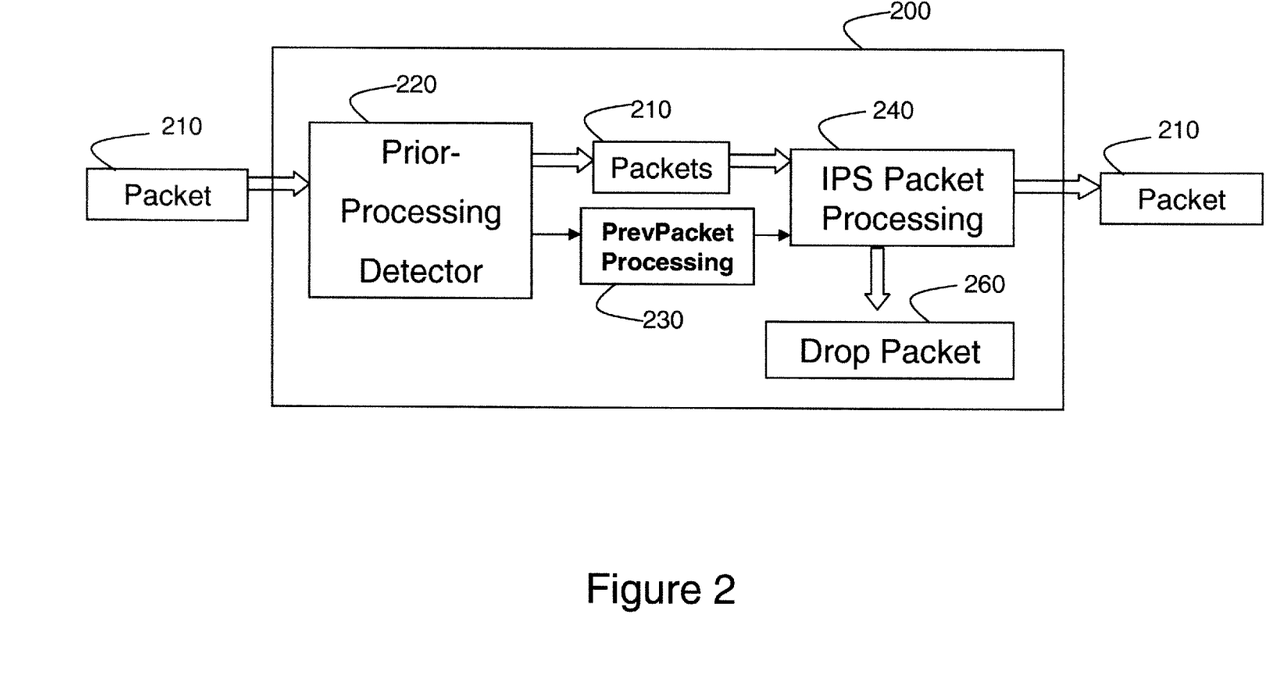
FIG. 2 illustrates schematically a mode of practicing the present invention wherein prior-processing detection 220 is conducted in series with other packet processing functions (e.g., IPS-related packet processing 240).

The embodiments just described involve adding a new function to packet processing devices, namely the ability to examine the packet identifiers described above, to determine whether packet processing needs to be performed on packets based on the contents of the packet identifiers, and to only perform processing on any particular packet which has not already been performed on that packet. One way to add this new function is to implement it in series with the other packet processing components as shown in FIG. 2, which illustrates a packet processing device 200 implemented according to one embodiment of the present invention. The packet processing device 200 receives a packet 210. The packet processing device 200 includes a previous packet processing detection function 220, which could be the first to inspect the packets 210 and to determine which processing, if any, has been done on the received packet by upstream packet processing devices. The previous packet processing detection function 220 would then pass the packet 210 to the IPS packet processing components 240, along with PrevProcess information 230, which describes the previous packet processing operations, if any, which have already been applied to this packet by upstream packet processing devices. Additionally or alternatively, the information 230 may specify which processing has not been and needs to be performed on the packet 210. The IPS packet processing components 240 use the PrevProcessing information 230 to avoid redundant packet processing. More specifically, the IPS packet processing components 240 may consider applying one or more packet processing operations to the packet 210, and only perform those operations on the packet 210 which the information 230 indicates (directly or indirectly) have not yet been performed on the packet. The previous processing detector function 220 (or the IPS packet processing components 240) may tag the packet 210 to indicate which packet processing operations have been applied to the packets 210 by the IPS packet processing components 240 (or which packet processing operations have not been applied to the packets 210 by the IPS packet processing components).

Figure 3:
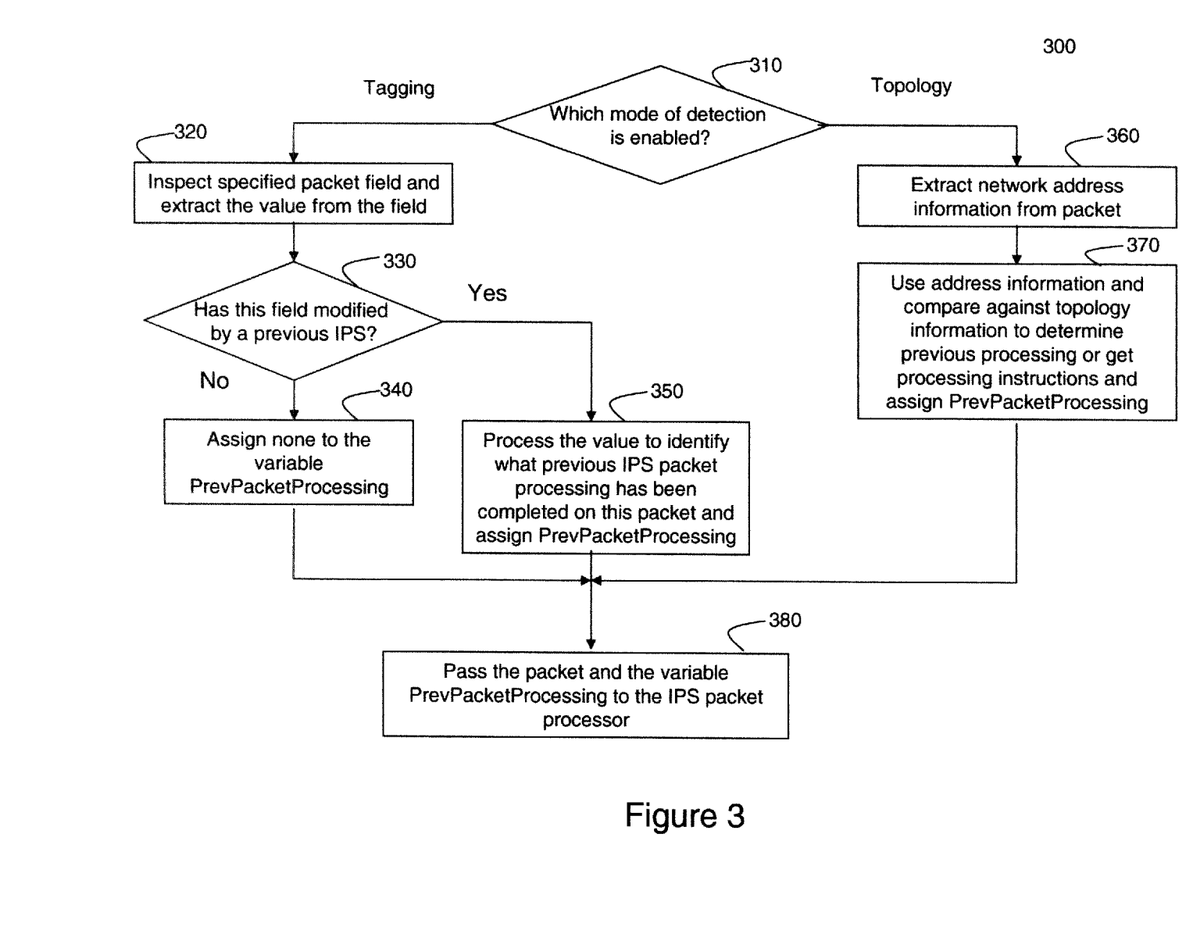
FIG. 3 provides a flow diagram illustrating logic employable in the performance of the present invention.

FIG. 3 depicts the logic used by the previous processing detector function 220. First, the previous processing detector function 220 determines if it is using tagging information or topology information to determine what processing should be done on the received packet at step 310. If the packet processing device 200 is in the mode of using tagging, then one or more fields of the scrutinized packet are inspected at step 320. Processing may be performed on the information extracted from the received packet 210 to, for example, decrypt and/or run algorithms to determine whether a trusted party (such as another IPS) assigned the tag value or values to the received packet at steps 330, 340, and 350. If the packet processing device 200 is in the mode of using topology information, then one or more packet address fields of the packet 210 are examined at step 360. The packet addressing information is used in conjunction with another data structure to determine which processing, if any, has been performed on the packet 210 and to determine which processing, if any, should be performed on the packet 210 by this device 200 at step 370. Independent of which mode the packet processing device 200 is in and how it determines which processing has been performed and/or should be done by this device 200, the previous processing detector function 220 passes the packet 210 and the information about which processing has been and/or should be performed to the IPS packet processor 240 at step 380.

The tag may, for example, be an extra field added to the packet 210. Alternatively, for example, one or more existing fields in the packet 210 may be repurposed to serve as the tag by writing over data received in the packet 210 with a filter processing identifier. Examples of fields which could be used for this purpose include the IP options field; the diffserv bits; and the VLAN/MPLS tags.

As described above, the prior processing detector 220 may use information about the network topology to determine which processing has been and/or should be performed on the packet 210. This method attempts to better understand the path of the packet 210 and the processing that the packet 210 will receive along its way from source to destination. First, information about the packet's path is obtained by inspecting packet address fields (as described above with respect to step 360) This address information may be used in conjunction with a data structure resident in the packet processing device 240, which contains either explicit filter instructions or information about previous and future processing done and to be done by other processing devices along the path of this packet 210, to determine which processing, if any, should be performed at the packet processing device 200 on this packet 210 information about the network topology and which processing is requested or which other processing should be performed can either be loaded into the packet processing device 200 and other packet processing devices by another device (such as a network management device SMS 151), or determined by the packet processing devices by inspection of and possibly participation in a topology protocol, such as a layer 2 spanning tree protocol; a layer 3 router protocol (such as RIP, OSPF, BGP, or IGMP); and/or packet processing device discovery protocols. Independent of how this topology related information is created and stored in the packet processing device 200, this information is used when the packet 210 is received by the packet processing device 200, along with one or more addressing field of the received packet 210, to determine which packet processing, if any, should be performed on this packet 210 directly, or to calculate which processing, if any, has been performed or will be performed later by other packet processing devices, and then to deduce which processing, if any, should be performed on this packet 210 by this packet processing device 200.

A variety of techniques may be used to deduce which packet processing operations have been performed or should be performed on the packet 210 based on network topology. For example, in one embodiment no assumptions are made about whether one or more IPSs are in the path of the packet 210 from its source on its way to its destination. In this embodiment, each packet processing device tags the packet to indicate which processing has been performed by that packet processing device on the packet 210. In this embodiment, the tagging should be implemented in a manner that does not affect the packet processing by the destination end node or other intermediary packet forwarding devices.

In another embodiment, the packet 210 is only tagged if there is known to be one or more IPSs which will process the packet 210 after the present IPS 200 processes the packet 210. This requires some topology related information. In this embodiment, the packet 210 may be encapsulated or otherwise modified in a manner that can be undone by another IPS after processing the packet 210. Care still must be taken to assure that intermediary packet forwarding devices are not affected by the packet modifications. The determination of which tagging method to use and which tag information should be used; is either assigned to the packet processing device 200 by another device (such as a network management device, such as the SMS 151) via data loaded by the SMS that maps packet addressing information into tagging and processing instructions; or determined by the packet processing device 200 with knowledge of the location of the IPSs in the network topology and one or more of the packet address fields.

Packet processing device 200 may use topology information to determine which processing to perform on the received packet 210 by, for example, loading a data structure that maps the source address, destination address, both source and destination addresses, or other fields in the packet 210 to explicit processing and tagging instructions. Alternatively, packet processing device 200 may load topology information and then use that information to identify which packet processing has been or needs to be performed based on information such as address fields of the packet, information about other packet processing devices in the network topology, and which tasks are assigned to each packet processing device.

Figure 1B:
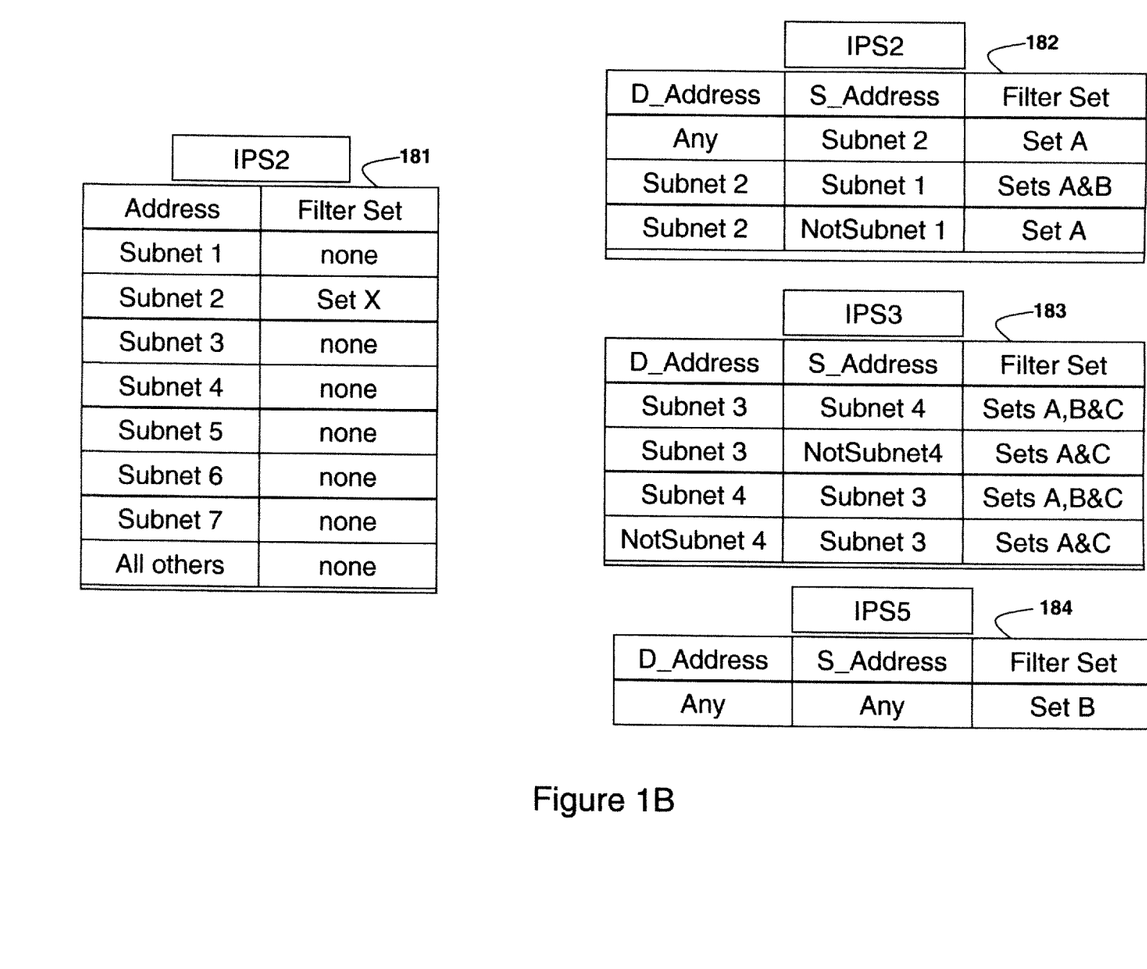
FIG. 1B illustrates schematically certain illustrative data structures in useful packet processing devices to map topology information and packet processing information.

The goal of not duplicating packet processing may be accomplished with many different policies. For example, one such policy is that one packet processing device is to perform all packet processing, and the other packet processing devices are to perform little or no other processing. To implement this policy, the first or last packet processing device may, for example, be assigned to perform all of the packet processing. Another example of a policy is one which distributes the packet processing load across multiple packet processing devices, where each packet processing device searches for different threats. Referring to FIGS. 1A and 1B, some examples of these approaches will now be described.

In the first example, the packet processing policy is to have the first packet processing device (e.g., IPS) perform all packet processing and to use network topology information to identify which packet processing has been and/or should be performed. The SMS 151 loads a data structure 181 (FIG. 1B) that maps source address information to packet filters. An IPS2 142 examines the source address field of a packet to identify the packet's source address. The IPS2 142 then locates this source address, or the subnet to which the source address belongs, in the loaded data structure to determine which filters should be used in processing the packet. As shown in table 181 (FIG. 1B), if the source address is from subnet 2, then IPS2 142 will process the packet using all the filters as indicated by SetX, which includes the full set of packet processing filters. If the source address were not subnet 2, then another IPS in the network would have been the first IPS to receive the packet, in which case that other IPS would have performed all of the required packet processing.

In the second example, the packet processing policy is for the last IPS to perform all packet processing and to use network topology information to identify which packet processing has been and/or should be performed. Assume for purposes of this example that the data structure 181 shown in FIG. 1B now maps destination address information to packet filters. The SMS 151 loads the data structure 181. An IPS examines the destination address of a packet, and then locates the destination address itself or the subnet to which the source address belongs in the data structure 181 to determine which filters should be used to process this packet. As shown in table 181, if the destination address is to subnet 2 then IPS2 142 will process the packet using filter set indicated by SetX, which includes the full set of packet processing filters.

If the destination address is used to identify which packet processing has been and/or should be performed, then multicast destinations as well as unicast destination must be handled. Since a multicast packet has multiple destinations, having the last IPS process the packet may result in multiple IPSs performing the same filtering. As a result, one process packets having a multicast destination address by using the source addresses of those packets and having the first IPS encountered by each of those packets perform the packet processing in the manner discussed above. Unicast packets could still be processed using the last IPS in the chain based on destination address, in the manner discussed above.

If the network management would prefer to distribute the packet processing across multiple packet processing devices and want to use topology information to identify which packet processing has been and/or should be performed, then both source and destination can be used to determine what packet processing has been assigned to the IPS receiving the packet. In the following example, there are three sets of filters. The filter SetA protects devices of one type; call them apples. The filter SetC protects devices of another type; call them oranges. The filter SetB protects against threats to both device types (apples and oranges) and is very compute intensive. The filters assignment rules are as follows: if the packets pass through IPS5, which a high-power multiple processor packet inspection device, then filter set B should be applied at IPS5 and not at the other IPSs. The apple-type end nodes reside in subnet 2 and the orange-type end nodes reside in subnet 1. The SMS 151, which knows the network topology and where the devices reside in that topology, constructs data structures describing such network topology and device locations, and sends those data structures to the IPSs.

As shown in FIG. 1B, IPS2 receives data structure 182 from the SMS 151 that instructs IPS2 to: apply filter SetA if the packet source address is from subnet 2 for any destination address; apply filter SetA if the packet destination is to subnet 2 from any source address other than subnet 1; and apply filter SetA and SetB if the packet destination is to subnet 2 and source address is from subnet 1. If the packet originates in subnet 1 and is destined to subnet 2, then the packet will first be received by switch 131 and then forwarded to IPS1, where IPS1 would apply the filter for the oranges (SetC). If the packet passes through the orange filter, then IPS1 would forward the packet. Router Layer 3 136 would then receive the packet and forward it to IPS2 which, as stated above, would apply set filer SetA and SetB, because the packet never passed through IPS5. If IPS2 received a packet that came from any other subnet, then the packet would have passed through IPS5, where filter SetB would have been applied.

Likewise, IPS5 146 receives a data structure 185 from the SMS 151, which instructs IPS5 to apply filter SetB to all packets no matter where those packets originate from or are destined to, because filter SetA or SetC would have been applied by another IPS before IPS5 received the packet due to the position of IPS5 in the network topology.

IPS3 143 receives a data structure 183 from the SMS 151 which instructs IPS3 to apply filter SetA, SetB, and SetC if the packet is traveling between subnets 3 and 4, and otherwise to only apply filters SetA and SetC. The servers in subnet 3 serve both the apples and the oranges, so both types of vulnerabilities are checked. If the packet does not pass through IPS5, then filer set B is also checked.

In the next example packet tagging is used to identify which packet processing has been and/or should be performed, and the packet processing policy is to have the first IPS to perform all packet processing. In this case packet filters SetA, SetB, and SetC will be processed by the first IPS to receive a packet. That IPS will then tag the packet to indicate that filters SetA, SetB, and SetC have already be processed on this packet. If another IPS receives a packet with the tag field indicating that filters SetA, SetB, and SetC have already be processed, then that IPS will forward the packet without processing those filters, which lowers packet latency and provides more bandwidth for the current IPS. For example, if a packet originates in subnet 1 and is destined to subnet 3, then IPS1 would be the first IPS to receive the packet, so it would apply filters SetA, SetB, and SetC, and tag the packet to indicate that these filter sets have been applied to this packet. IPS1 would then forward the packet to IPS5 146 via Router Layer 3 136. IPS5 would see that the packet was tagged, indicating that filters SetA, SetB, and SetC have already been applied. As a result, IPS5 146 would forward the packet to IPS3 via Router Layer 3 138. IPS3 143 would also see that the packet was tagged to indicate that filters SetA, SetB, SetC have already been applied, and IPS3 would forward the packet to switch 133.

In this example only three bits need to be used as a tag field. In this example Class of Service (CoS) is determined by the 802.1p bits in the layer 2 header by the switches and routers of this LAN. The IP diffserv bits are not used to determine the CoS of a packet, so the IPS devices could repurpose the IP diffserv field to contain the packet processing tag. Although in this very simple example only 3 bits are used, other more complicated tagging methods could, for example, use encryption algorithms and fields spanning multiple packets.

Tagging packets "in the clear" can cause security problems. For example, an end station may tag the packets its sends to prevent those packets from being inspected by IPSs. Such security problems may be addressed in a variety of ways. For example, tags may be encoded so that IPSs can verify that tags were assigned by a trusted party, such as another IPS, and not by an unauthorized end node trying to avoid packet inspection. There are two main functions provided by the packet tag encoding, first to prevent non-trusted parties from locating or interpreting the tag field, and second to allow the packet processing device to verify the tag value was generated by a trusted party. There are a variety of ways to provide these two functions.

For example, one method is to create a tag value, that when processed by an algorithm produces a value with two components. One component contains the unencoded value that indicates the packet processing which has been performed and/or needs to be performed on this packet. The other component contains a value used to prove that an authorized party has assigned the encoded value to the packet. More complicated multi-field methods could be used. For example, one field could be repurposed or added to indicate which field or fields contain a real encoded value.

Both topology information and tagging may be used to distribute the load across two or more packet processing devices or to utilize tagging that is added by one packet processing device and removed by another. For example, an IPS that receives a packet may inspect the packet's tag to identify which processing operations have not yet been performed on the packet. The IPS may then use network topology information to determine which downstream IPSs have the ability to perform any remaining packet processing operations on the packet. The IPS may use this combination of tag information and network topology information to decide whether to perform any of the remaining packet processing operations on the tag, or to leave such operations to downstream IPSs to perform. For example, if the current IPS is capable of performing the necessary processing operation(s) on the packet but the current workload of the current IPS is high and downstream IPSs are also capable of performing the necessary processing operation(s) on the packet, then the current PS may decide not to process the current packet. If, however, no downstream IPSs are capable of performing the necessary processing operation(s) on the packet, the current IPS may process the current packet even if the workload of the current IPS is high.

The topology information and placement of the IPSs in that topology can be used by the IPS to know whether to tag a packet or remove a previous tag. If there is another IPS between this IPS and the packet destination, then the packet may be tagged to indicate that such processing has been performed on it. In this way, a combination of tagging information and network topology information may be used to dynamically distribute packet processing workload across multiple IPSs in a network based on factors such as the processing capabilities and workloads of those IPSs. The distribution of packet processing may change dynamically in response to changes in IPS workload, the addition/removal of IPSs from the network, and other changing features of the network over time. This distributed method has advantages over a centralized method where new work load data or instructions needs to be redistributed in reaction to topology, IPS additions and subtractions from the topology, and operation states and loads of each IPS. The distributed method just needs to keep aware of the other IPSs state and locations and can make packet by packet processing decisions without waiting for instructions from the centralized decision maker.

Figure 4:
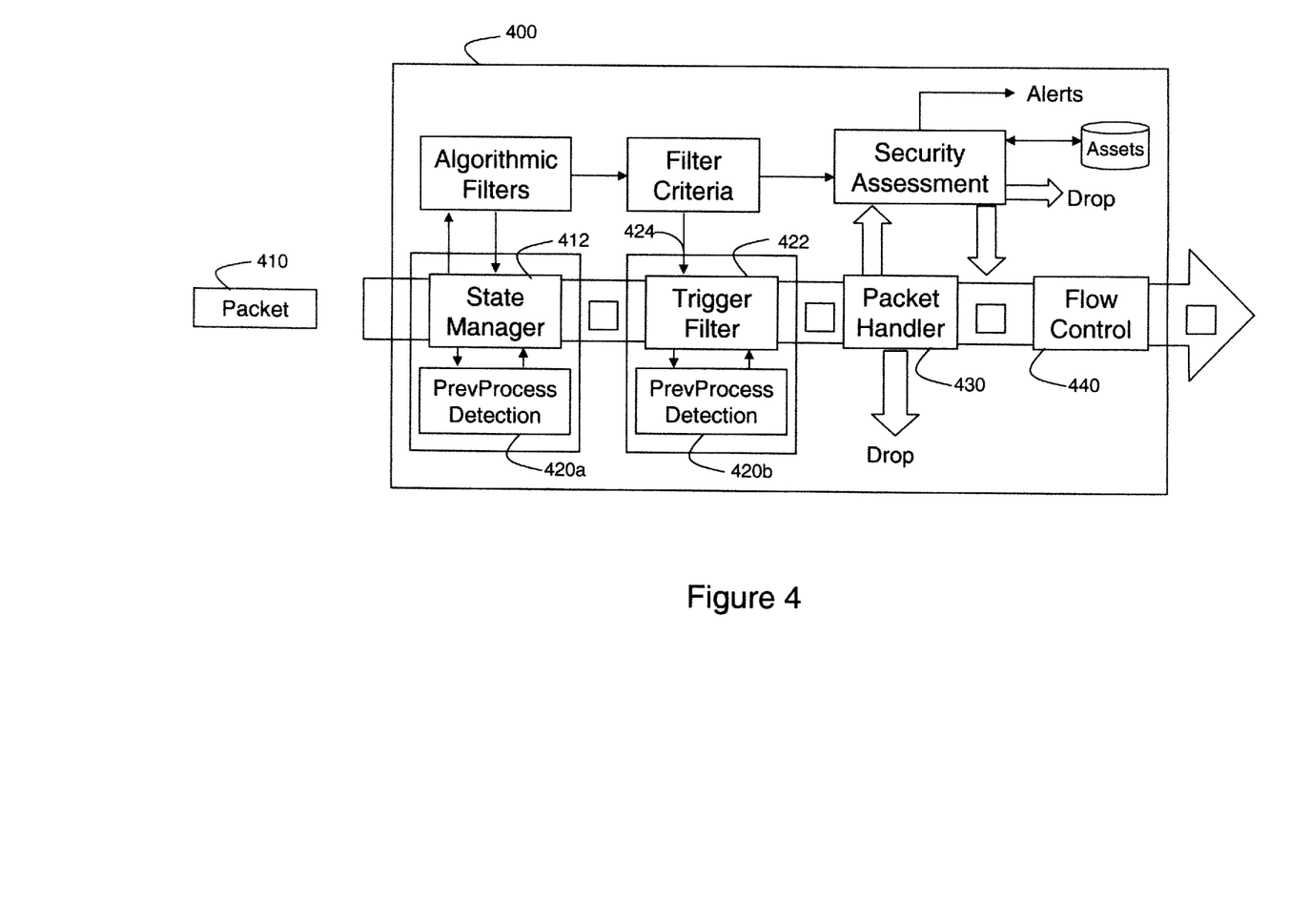
FIG. 4 illustrates schematically another mode of practicing the present invention, wherein prior-processing detection 420a, 420b is integrated into other packet processing functions (e.g., state and filter functions 411, 422 of IPS-related packet processing 400.

Now referring to FIG. 4, an embodiment is shown of a system 400 which illustrates two other possible places to position the previous packet processing detector function (implemented by element 220 in FIG. 2). Instead of adding this function in series, up team of the IPS packet processing, it could be integrated into the other functions of an IPS device. A number of in-line functionalities are provided by the system 400.

The first of those functionalities comprises a state manager functionality 412. The state manager 412 performs two key operations in connection with the active monitoring of the data flow. First, the state manager 412 implements a session management operation. This session management operation monitors and manages the state of each session relating to packet traffic being carried over the data flow. More specifically, the session management operation tracks, such as with a table or other mechanism, which sessions are currently in existence on the data flow and saves historical packet related data for examination. Each packet 410 in the data flow is examined in-line by the state management operation 412 for the purpose of ensuring that individual packets are associated with a recognized session. In the event a packet 410 is examined which is not associated with a session, that rogue packet 410 may be identified as suspicious or threatening and then blocked by the system 400.

Second, the state manager 410 implements a packet and flow reassembly operation. In connection with this operation, it is recognized that attacks on the network may be split over multiple packets. In this way, the attacker tries to hide the attack over several packets which individually appear to be benign. To guard against this, the packet and flow reassembly operation within the State Manager 412 monitors the data flow with respect to established connections and examines plural packets, and their contents, over time in order to try and detect the existence of an attack. In this way, the packet flow and reassembly operation tracks packets and their payloads, identifies relationships between packets, and reassembles the packet payloads together, with the reassembled packet data being analyzed for threat potential. In the event a collection of packets for a common flow are examined and when reassembled are determined to present a threat, those packets (and related packets in the same flow or session) may be blocked by the system 400 and/or the flow/session associated with those threatening packets may be terminated by the system 400. Thus, this functionality allows for the tracking of pattern matching across packet boundaries.

The state manager 412 can interact with PrevProcess Detection 420a to use tagging or topology information to determine which processing has been performed on the packet 410 and/or what processing needs to de done on the packet 410. The state manager 412 may, for example, be implemented as an application-customized piece of hardware in order to ensure its ability to perform the necessary tasks at maximum possible speed (preferably exceeding line speed for the data flow).

A second of the in-line functionalities provided by the system 400 comprises a trigger filter functionality 422 which implements a form of stateful pattern matching that facilitates deep packet inspection. The trigger filter 422 performs two filtering operations in connection with the active monitoring of the data flow. First, a packet header matching operation looks into each packet 410 and determines whether the header field values therein give rise to a suspicion of dangerous traffic. This operation involves checking the fixed header fields (such as, for example, destination and source IP address, destination and source ports, and the like) for the presence of information indicative of an attack. For example, packets may be classified based on their header information. This classification can then be used alone to filter, or it can be used to provide context when performing other filtering operations as discussed next. This header information can be shared with PrevProcess Detection function 402b and the PrevProcess Detection function 402b can return information about what processing has been done of what processing should be done on this packet.

Second, a packet content matching operation looks into each packet 410 and determines whether the content (character) strings and/or regular expression values therein give rise to a suspicion of dangerous traffic. This operation involves matching the packet payload elements to strings and expressions identified as being associated with an attack. It will be recognized that the packet header matching operation and the packet content matching operation may advantageously operate in conjunction with each other to detect suspicious packet traffic based on a detected combination of header field values and content strings/regular expression values. In situations where a threat is detected, the dangerous packets may be blocked by the system 400 and/or the sessions associated with those packets may be terminated by the system 400.

Although the description above is focused on a trigger operation that looks for dangerous or suspicious traffic (and then blocks that traffic), it is possible that in some situations the triggers could be implemented, and the filters designed, to look for the qualities and characteristics of "good" traffic. In this case, it would be all packets that fail to be identified as meeting the "good" criteria which are blocked by the system 400, with the identified good traffic being allowed to pass. Packet tagging can be used to indicate that this packet 410 has been deemed good, so that subsequent downsteam IPS systems that receive this packet 410 may skip redundant processing.

The trigger filter functionality is preferably implemented as an application-customized piece of hardware in order to ensure its ability to perform the necessary tasks at maximum possible speed (preferably exceeding line speed for the data flow). More specifically, the process for fast path pattern matching is performed through the use of plural, hardware implemented, pattern matching components in a parallel processing architecture. This configuration allows the system to operate at line speeds and further provides for future scalability.

To assist in the operation of the trigger filter functionality 422, filtering criteria (or rules) 424 are supplied to both the packet header matching operation and the packet content matching operation. These rules 424 include both detection triggers as well as detection exceptions. A detection trigger is an identification of one or more header field values, content strings and/or regular expression values, singly or in combination with each other, whose matched presence within the payload elements of a packet of a single session is indicative of a threat to the network. A detection exception is an identification of one or more header field values, content strings and/or regular expression values, singly or in combination with each other, whose presence within the payload elements of a packet of a single session, while possibly being of concern, should nonetheless not be considered as being indicative of a threat to the network. A translation functionality is provided to translate the detection triggers and detection exceptions into the filtering criteria (or rules) 424 which are supplied to, and acted upon by, the packet header matching operation and the packet content matching operation of the trigger filter functionality 424. This translation may, for example, comprise a conversion of the data into lower level machine code for implementation by the packet header matching operation and the packet content matching operation.

The detection triggers and detection exceptions are derived from a set of detection signatures that are specifically designed or tailored for the identification, detection and suppression of recognized single session type network threats. For example, the detection signatures (comprising, for example, security rules, policies and algorithms) may be designed to mitigate or avert network damage from detected vulnerabilities. These signatures may be obtained from any one of a number of well known sources, including, for example, machine (host) manufacturers, service suppliers, the Internet, and the like. Additionally, the signatures may be created by an administrator of the protected network. Still further, the signatures may be supplied by a entity in the business of signature creation, where that entity operates to collect threat information (for example, worm, virus, trojan, denial of service, Access, Failure, Reconnaissance, other suspicious traffic, and the like) from around the world, analyze that information and design detection signatures that can be used by others to mitigate or avert network damage from the collected threats.

The operations relating to filter criteria management as discussed above are preferably implemented as a customizable software application (that interfaces with the hardware trigger filter functionality) in order to ensure its continued flexibility and ability to be tailored or tuned to security risks. In this way, the threat detection capabilities of the system can be scaled as needed.

Preferably, the filtering comparison operation performed by the trigger filter functionality 422 is implemented on either or both the packet level and/or the session level. On a packet level, the inspection and filtering operation considers each packet individually when applying the rules of the detection signatures. On a session level, the inspection and filtering operation considers a plurality of related packets together when applying the rules of the detection signatures. To assist in a session level comparison, the system 400 may rely on the state information relating to the stored historical packet related data. For a session level comparison, the comparison and filtering not only considers the extracted packet features (header and payload) for the current packet under examination, but also historical packet related data. In the event of a match between the signature criteria and the combined extracted packet features and historical packet related data, a potential threat to the network is detected.

A third of the in-line functionalities provided by the system 400 comprises a packet handler functionality 430. The packet handler functionality 430 operates, responsive to the evaluations and conclusions reached by the state manager functionality 412 and the trigger filter functionality 422, as a gatekeeper and determines how the packets and/or sessions are to be handled. More specifically, the packet handler functionality 430 compiles the analysis and examination results of the state manager 412 and the trigger filter functionality 422 to determine whether a certain packet is of interest and then acts appropriately on that packet. Three handling options are available for packets determined to be of interest. First, to the extent that neither the state manager functionality 412 nor the trigger filter functionality 422 detect any threat, danger, or suspicion with respect to a certain packet or session, that packet traffic is allowed to pass and continue along the data flow. Second, to the extent either the state manager functionality 412 or the trigger filter functionality 422 detect a clear threat or danger with respect to a certain packet or session, that packet traffic is blocked and dropped from the data flow. Third, to the extent either the state manager functionality 412 or the trigger filter functionality 422 detect a suspicion of a threat or danger with respect to a certain packet or session, that packet traffic is extracted from the data flow for further, more careful, examination as will be discussed in more detail herein. This packet handler functionality is preferably implemented in hardware in order to preserve its ability to act quickly in making the sorting decisions with respect to the passing packets in the data flow.

A fourth of the in-line functionalities provided by the system 400 comprises a flow control functionality 440. The flow control functionality 440 operates to shape the traffic flow output along the data path based on certain programmable or configurable priorities. Traffic shaping is primarily accomplished by throttling up (or, conversely, throttling down) the rate at which certain packet traffic is allowed to pass along the data path. For example, known and confirmed benign traffic may be prioritized for transmission along the data path. Similarly, packet traffic relating to known mission critical applications may be given priority over other less critical traffic. More generally, traffic of a certain type can be throttled such that it does not exceed a certain threshold volume. This serves to prevent the over-running of downstream resources or interfering with higher priority traffic. This flow control functionality is preferably implemented in hardware in order to preserve its ability to act quickly in making the handling decisions with respect to the passing packets in the data flow.

While a few illustrative embodiments of the present invention have been discussed, it is understood that various modification will be apparent to those skilled in the art in view of the description herein. All such modifications are within the spirit and scope of the invention as encompassed by the following claims.

The invention claimed is:

1. A network comprising:
a first packet processing device to apply a first filtering operation on a data packet; and
a second packet processing device to
receive the data packet from the first packet processing device,
determine filtering operations previously performed on the data packet,
identify the first filtering operation as a filtering operation previously performed on the data packet,
based on the identification of the first filtering operation, apply a second filtering operation, different from the first filtering operation, on the data packet, and
add a tag to the data packet to indicate the second filtering operation applied on the data packet.

2. The network of claim 1, wherein determine filtering operations previously performed on the data packet includes inspect a field of the data packet, wherein said field contains a value signifying the first filtering operation.

3. The network of claim 2, wherein said value is encrypted.

4. The network of claim 2, wherein said value signifies an entry or entries in a data structure, wherein said entry or entries correlate with the first filtering operation.

5. The network of claim 2, wherein said value identifies the first packet processing device as the device that previously executed the first filtering operation on the data packet.

6. The network of claim 1, wherein determine filtering operations previously performed on the data packet includes:
inspect an address field of the data packet; and
use network topology information in conjunction with the address in the address field to identify the previous filtering operations.

7. The network of claim 1, further comprising:
a management agent to assign the first filtering operation to the first packet processing device and assign the second filtering operation to the second packet processing device.

8. The network of claim 7, wherein the second packet processing device is further to
determine whether the first filtering operation has been performed on the data packet,
if the first filtering operation has been performed on the data packet, apply only the second filtering operation on the data packet, and
if the first filtering operation has not been performed on the data packet, apply both the first and second filtering operations on the data packet.

9. The network of claim 1, wherein said second packet processing device is to apply the second filtering operation only if said second packet processing device detects that said second filtering operation had not previously been executed on said data packet.

10. A packet processing device suitable for installation in a network to thereby provide therein an intrusion prevention system, the packet processing device comprising:
- a port to receive data packets;
- a data packet inspector to inspect the data packets; and
- a data packet filter to filter the data packets in response to the inspection of the data packets by the data packet inspector,
- wherein the data packet inspector is to identify filtering operations previously applied on the data packets by another packet processing device,
- based on the identified previous filtering operations, the data packet filter is to apply a filtering operation, different from the identified previous filtering operations, on the data packets, and
- wherein the data packet filter is further to add a tag to the data packets to indicate the filtering operation applied to the data packets.

11. The packet processing device of claim 10, wherein, to identify filtering operations previously applied on the data packets, said data packet inspector is to inspect an address field of the data packets and use network topology information in conjunction with the address in the address field to identify the previous filtering operations.

12. The packet processing device of claim 10, wherein said data packet inspector is to inspect a field of the data packets, wherein said field contains a value signifying said previous filtering operations.

13. The packet processing device of claim 12, wherein said value is encrypted.

14. The packet processing device of claim 12, wherein said value signifies an entry or entries in a data structure, wherein said entry or entries correlate with said previous filtering operations.

15. The packet processing device of claim 12, wherein said value identifies the another packet processing device as the device that previously executed said filtering operations on the data packets.

16. A method for processing data packets by a packet processing device, the method comprising:
- receiving a data packet;
- identifying, by the packet processing device, filtering operations previously performed on the data packet by another packet processing device, including inspecting an address field of the data packet and using network topology information in conjunction with the address in the address field to identify the previous filtering operations; and
- based on the identified previous filtering operations, applying a filtering operation, different from the identified previous filtering operations, on the data packet.

17. The method of claim 16, further comprising:
- adding a tag to the data packets to indicate the filtering operation applied on the data packet.

18. A packet processing device suitable for installation in a network to thereby provide therein an intrusion prevention system, the packet processing device comprising:
- a port to receive data packets;
- a data packet inspector to inspect the data packets; and
- a data packet filter to filter the data packets in response to the inspection of the data packets by the data packet inspector,
- wherein the data packet inspector is to inspect a field of the data packets to identify filtering operations previously applied on the data packets by another packet processing device, wherein the field contains a value signifying the previous filtering operations applied on the data packets, and
- based on the identified previous filtering operations, the data packet filter is to apply a filtering operation, different from the identified previous filtering operations, on the data packets.

19. The packet processing device of claim 18, wherein the value is encrypted.

20. The packet processing device of claim 18, wherein the value signifies an entry or entries in a data structure, wherein the entry or entries correlate with the previous filtering operations.

21. The packet processing device of claim 18, wherein the value identifies the another packet processing device as the device that previously executed the filtering operations on the data packets.

* * * * *